US007702122B2

(12) United States Patent
Crutcher

(10) Patent No.: US 7,702,122 B2

(45) Date of Patent: Apr. 20, 2010

(54) HEADGEAR FOR DOCKING AND LISTENING TO PORTABLE AUDIO DEVICES

(76) Inventor: William C. Crutcher, 84 Munson Rd., Middlebury, CT (US) 06762

( * ) Notice: Subject to any disclaimer, the term of this patent is extended or adjusted under 35 U.S.C. 154(b) by 0 days.

(21) Appl. No.: 12/348,252

(22) Filed: Jan. 2, 2009

(65) Prior Publication Data

US 2009/0175482 A1 Jul. 9, 2009

Related U.S. Application Data

(60) Provisional application No. 61/019,928, filed on Jan. 9, 2008.

(51) Int. Cl.

| | |
|---|---|
| ***H04R 25/00*** | (2006.01) |
| ***H04M 1/00*** | (2006.01) |
| ***H04M 9/00*** | (2006.01) |

(52) U.S. Cl. ........................................ 381/376; 379/430

(58) Field of Classification Search ................. 379/430; 381/370.374–379, 384; 2/68, 171

See application file for complete search history.

(56) References Cited

U.S. PATENT DOCUMENTS

| | | | |
|---|---|---|---|
| 4,683,587 | A | 7/1987 | Silverman |
| 5,438,698 | A | 8/1995 | Burton |
| 5,881,160 | A | 3/1999 | Sheppard |
| 7,044,615 | B2 | 5/2006 | Gesten |
| 2006/0251283 | A1 | 11/2006 | Yeh |
| 2007/0226876 | A1 | 10/2007 | Foust |

*Primary Examiner*—Tuan D Nguyen

(57) ABSTRACT

A cap for listening to an audio device such as an MP3 player or iPod has a pocket in the back with a spring-loaded double-ended retractor for pulling a stereo jack to the front of the cap for connecting to an audio device, adjusting it and returning the retractor along with the audio device to the pocket. The stereo jack is connected to ear buds via wires leading from a T-shaped anchoring junction secured in the bottom of the pocket. The ear buds hang from opposite sides of the cap and are placed in bud pockets on the cap when not in use.

10 Claims, 6 Drawing Sheets

HEADGEAR FOR DOCKING AND LISTENING TO PORTABLE AUDIO DEVICES

CROSS REFERENCE TO RELATED APPLICATIONS

Figure 1:
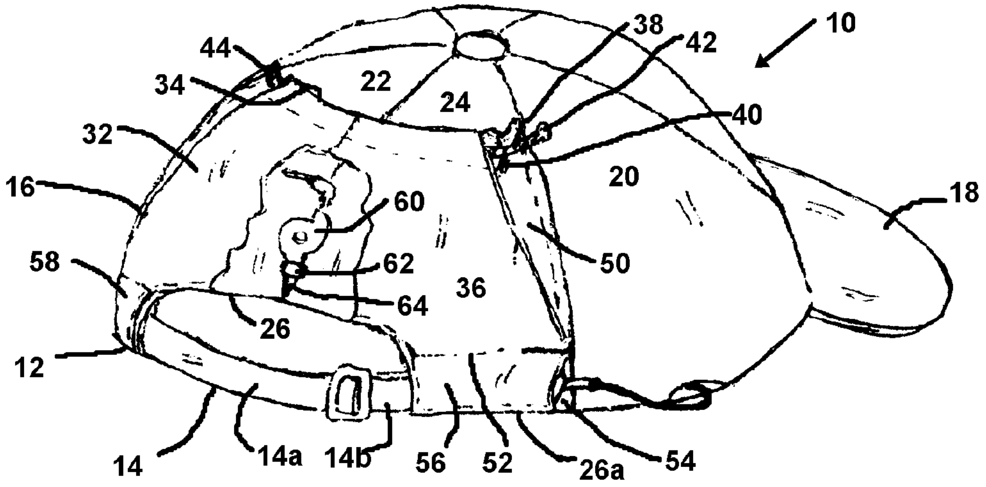

This application claims the benefit of prior filed provisional application Ser. No. 61/019,928 filed Jan. 9, 2008.

TECHNICAL FIELD AND INDUSTRIAL APPLICABILITY OF THE INVENTION

This invention relates to a system for docking and listening to portable audio devices and more particularly to headgear especially adapted to carry an audio device and to connect it for listening and manipulating the audio device in the field of vision of a user while wearing the headgear.

BACKGROUND OF THE INVENTION

Portable audio devices are well known and take many forms. These include AM and FM radios, audio tape players, and digital audio players such as iPod and MP3 players. The content of the players may be live or prerecorded on suitable media used to listen to popular or classical music or recorded books. The audio players are usually transported by carrying in the pocket, or attaching them to a belt or by strapping them to the arm. A mono or stereo connector jack is inserted into an audio output receptacle on the portable audio device. From there an electrical cord leads to an earphone headset or to small individual ear buds incorporating tiny loudspeakers placed in the ears. In some cases, an earphone headset is used to directly carry an integrated audio device without an interconnecting cord.

Many users prefer an audio device with a plug-in jack attached to an electrical cord running to ear buds or to an earphone headset. In the case of ear buds, the cord branches into two segments leading to individual buds for the left and right ears or to ear buds mounted on either side of a headset. If the audio device is equipped for stereo sound, one earphone and one branch segment of the connection cord is used for each stereo track, and merge at a junction into a common twin wired segment connected to a stereo plug-in jack.

The presence of the electrical cord is a great annoyance, because movement of the head with respect to the body of the user in cases where the audio device is pocketed or strapped in place causes the cord to intermittently contact the face or neck. Turning the head tightens one of the branch cords which can pull out one ear bud. Also the weight of the cord or catching of the cord in clothing or on external objects causes pulling against the connector jack or the audio device, which can cause both of the ear buds to become dislodged. This is disconcerting because it interrupts listening to the music or book as the audio device continues to run while the ear buds are being re-positioned.

Another annoyance is that movement of the wires against the face or clothing can create noise or static which is heard in the ear buds along with the audio program, degrading the listening experience.

In order to eliminate the annoyance of electrical cords touching the body or becoming entangled in clothing, several authors have suggested adapting headgear, such as caps, visors or headbands to carry speakers or to function with audio devices connected to ear buds, thereby shortening or eliminating the electrical cords connecting the ear buds to the audio device. Some of these prior art suggestions are described below in a listing which is exemplary, but not necessarily all-inclusive.

U.S. Pat. No. 4,864,619 issued Sep. 5, 1989 to Spates shows headphone speakers built into a soft resilient headband connected via a cord leading from the back of the headband to a stereo jack. The audio device is not shown in the patent but it is suggested that the jack might be "connectable to any small stereophonic audio reproduction system that may be integrated with, or directly attached to, the headband-headphone assembly".

U.S. Pat. No. 5,438,698 issued Aug. 1, 1995 to Burton et al. describe a wearable audio device removably attached to an enclosure that, in turn, is removably attached to the back of a headband. The enclosure contains an electrical connecting cord (looped back and forth to serve as a radio antenna) extending from a plug-in jack to a pair of ear buds. The volume, tuning and off-on controls are exposed for manual operation removing the radio.

U.S. Pat. No. 5,881,160 issued Mar. 9, 1999 to Sheppard discloses a cap with a support bracket positioned inside the cap holding a tape player inside the crown electrically connected on opposite sides to speakers disposed in small ear pieces hanging from the lower edge of the cap. The settings and adjustments of the tape player must be made before the cap is put on and the speakers put in place.

U.S. Pat. No. 7,044,615 issued May 16, 2006 to Gesten discloses a billed cap with an audio device built into the bill. Speakers, controls and a visual display are on the underside of the bill. No ear buds are disclosed.

Pending patent application 2006/0251283, published Nov. 9, 2006 to Yeh discloses a bag for holding an audio device such as an MP3 player. The bag is equipped with stereo jack connected to ear buds that may be retracted up to the bag, either with a winding reel or with a pull cord. In one embodiment the bag is mounted inside a cap. The audio device is connected to the stereo jack and inserted into the bag.

Pending patent application 2007/0226876, published Oct. 4, 2007 to Foust et al discloses a cap with pockets for carrying an MP3 player and the associated wires. One of the pockets holds the audio device and a separate pocket holds the wires. The wires are bundled on a mandrel that is inserted into the wire pocket.

One disadvantage in all of the foregoing devices that employ ear buds is the inability to see and manipulate the controls of the audio device while wearing the headgear and listening to the audio device through the ear buds. It is very difficult to properly select the audio content (music or voice) to be heard and to adjust the volume unless the controls and display can be seen and manipulated while listening to the audio content.

Accordingly, one object of the present invention is to provide headgear especially adapted for connecting, adjusting, docking and listening to a portable audio device.

Another object of the invention is to provide headgear especially adapted to carry an audio device and to connect it for listening and manipulating the controls of the audio device in the field of vision of a user while wearing the headgear.

Still another object is to eliminate the annoyance of electrical wires attached to ear buds that touch the face and neck of a user or cause noise or static caused by rubbing of the wires against the body or clothing.

SUMMARY OF THE INVENTION

Briefly stated, the invention comprises headgear having a headband, a pocket for holding an audio device, and an electrical connection cord for the audio device having a plug-in jack on one end of a common segment of the cord and an anchoring junction leading to two branches that are connected to a pair of ear buds at the respective ends of the two branches. The pocket has a top opening adapted to stretch or yield to accept the audio device. The anchoring junction is secured in the bottom of the pocket. The common segment of the connection cord is arranged to extend from the jack to the anchoring junction with a sufficient length for the connected audio device to be held in the field of vision of the user when the headgear is in place. From the inside of the pocket, the branches of the connecting cord extend to locations near the user's ears and through passages leading to apertures in the headband so that the ear buds hang from the headband for placement in the user's ears. The headgear is equipped with small bud pockets for holding the ear buds and cords out of the way when the audio device is not in use. Another form of the invention simply coils the common segment into the pocket along with the audio device. The preferred embodiment of the invention employs a double-ended spring-loaded cord retractor interposed in the center of the common segment and arranged to extend or retract the common segment between the anchoring junction and the jack.

DRAWINGS

Figure 2:
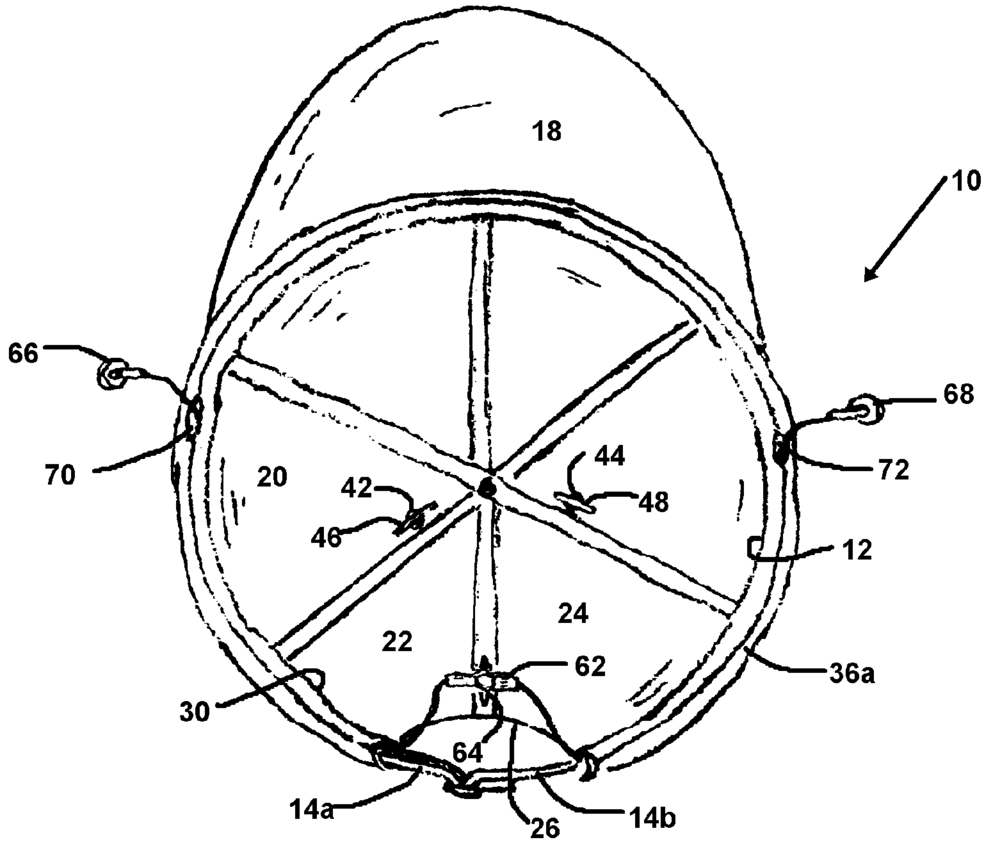
Figure 3:
Fig. 3 (prior art)
Figure 4:
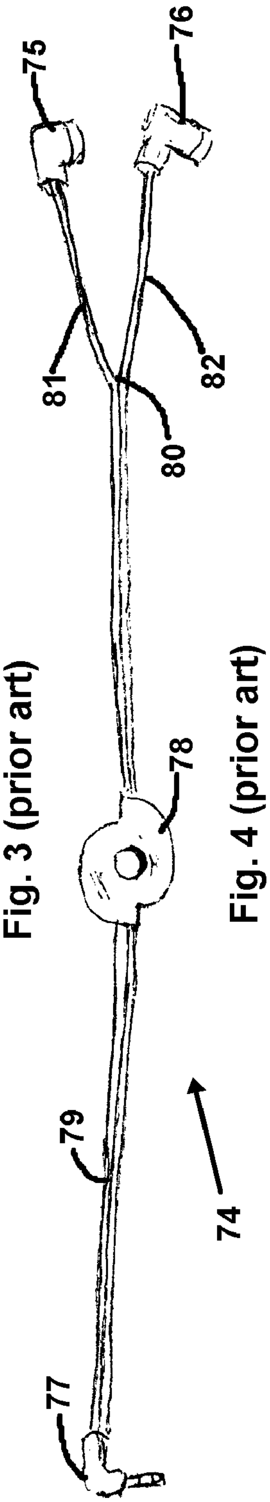
Fig. 4 (prior art)
Figure 5:
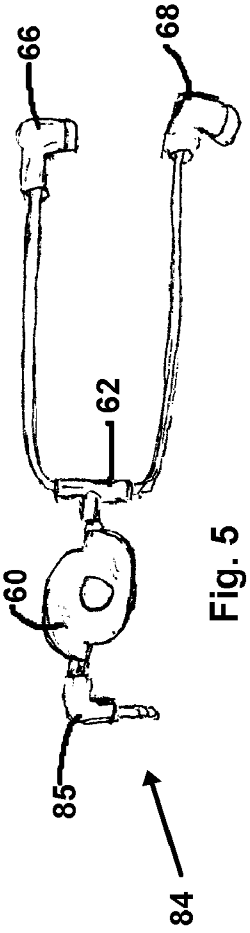
Figure 6:
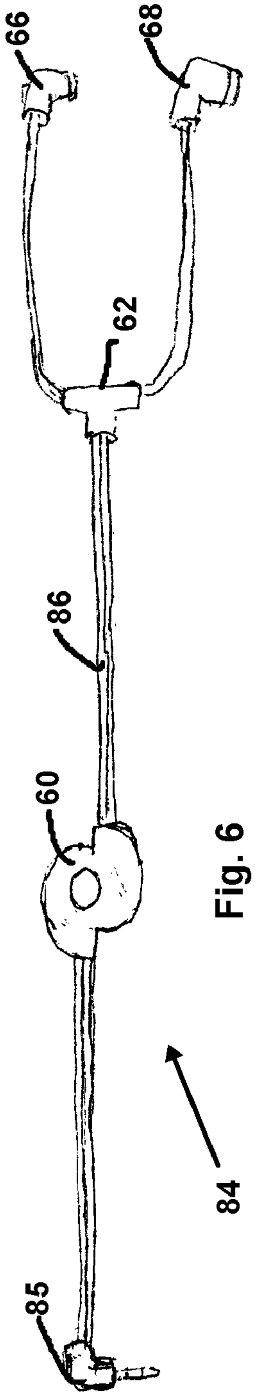
Figure 7:
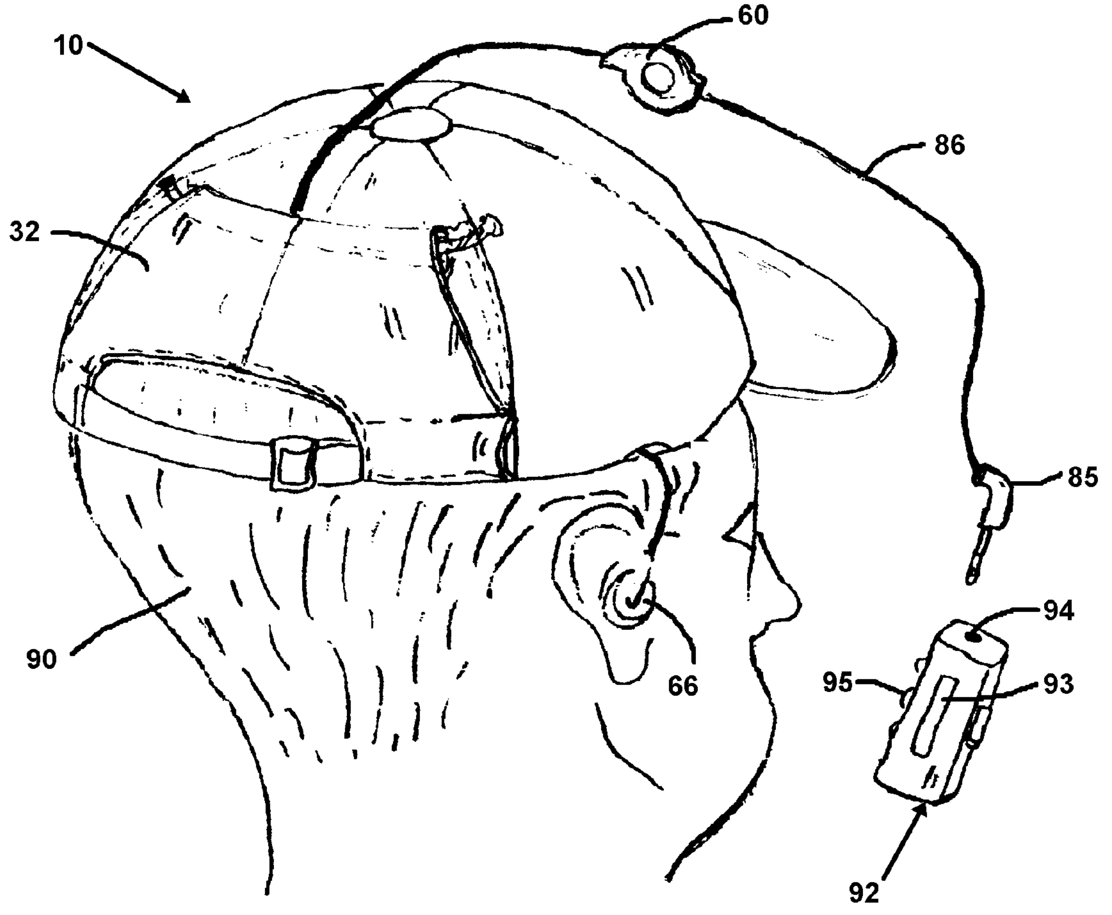
Figure 8:
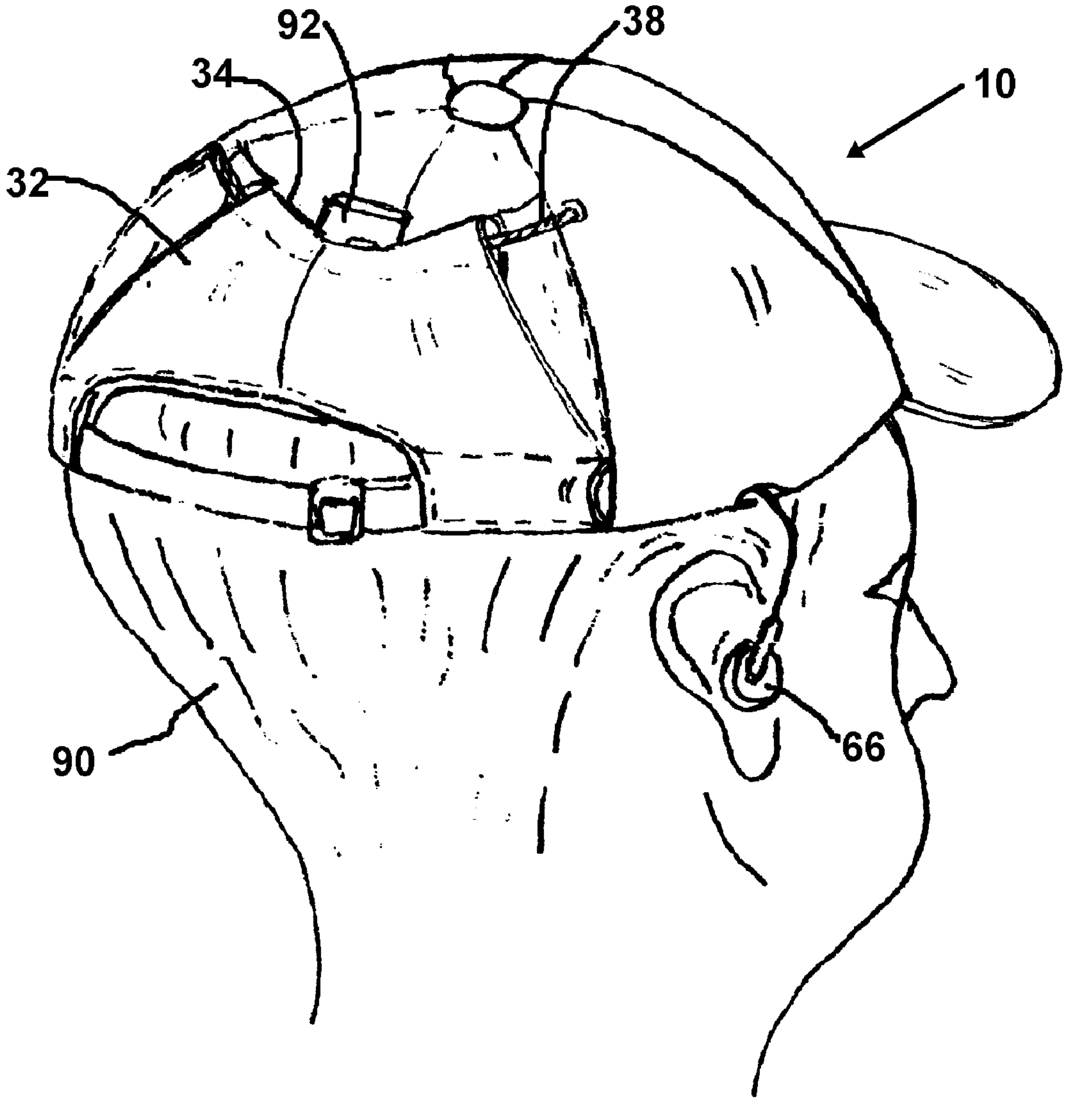
Figure 9:
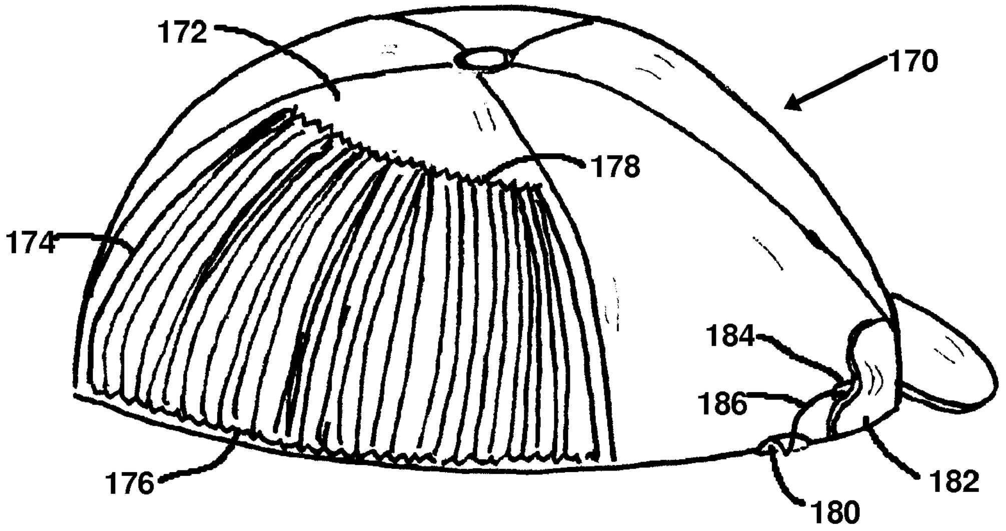
Figure 10:
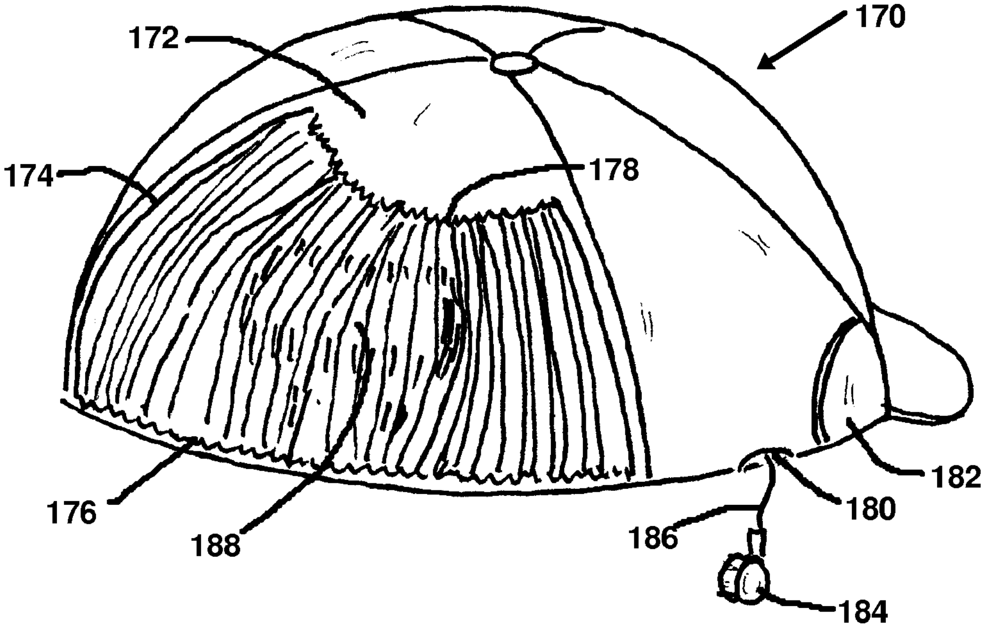
Figure 11:
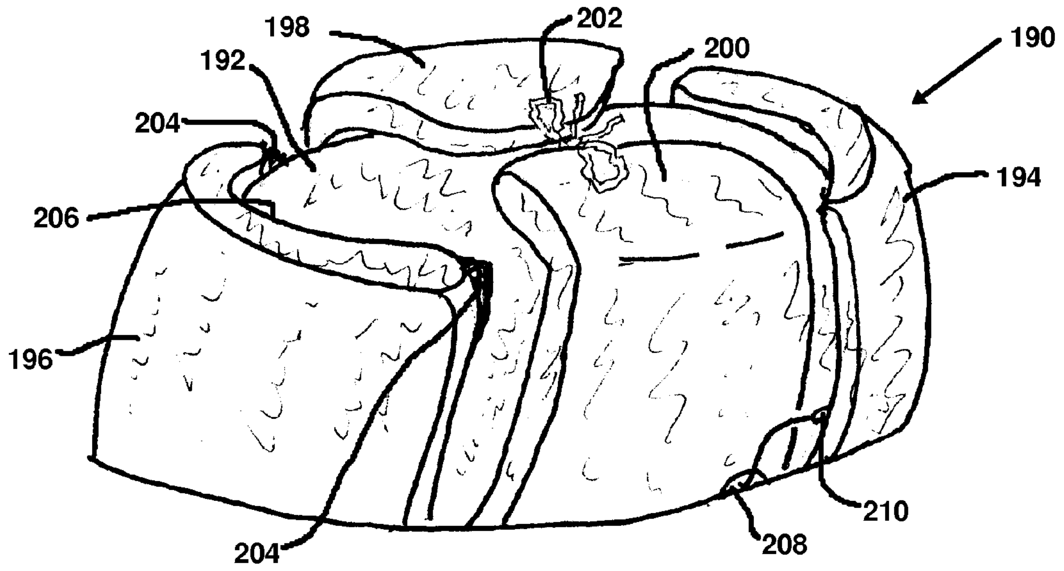
Figure 12:
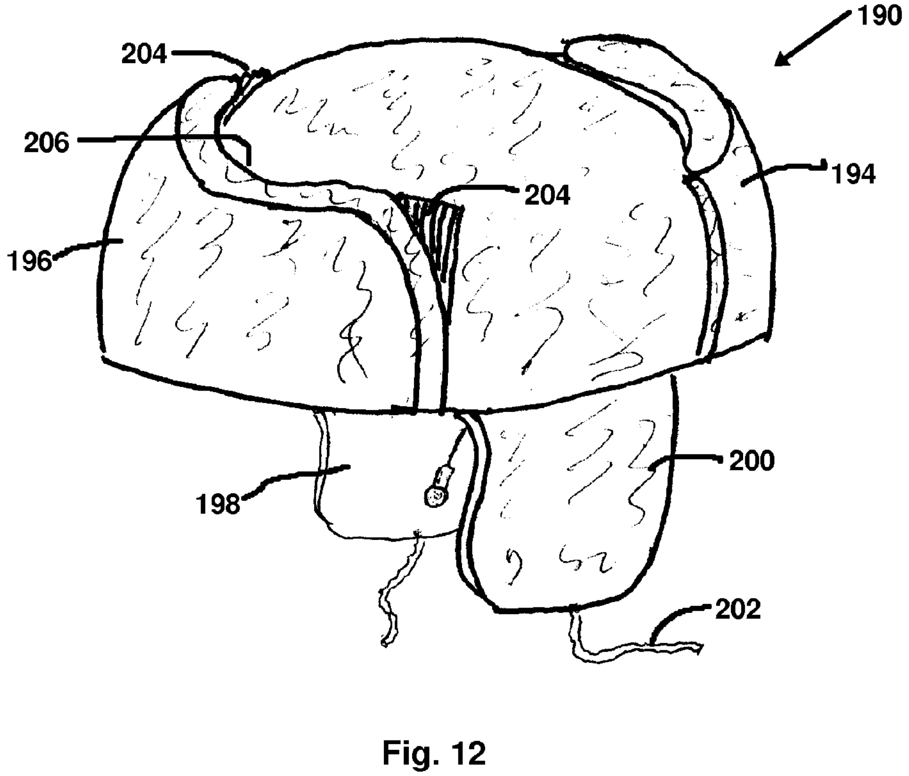

The invention will be better understood by reference to the following description, taken in connection with the accompanying drawings, in which:

FIG. 1 is a perspective view from the back and side of the headgear with the fabric member forming a pocket with a portion partially removed to show the interior and with ear buds stowed, FIG. 2 is a bottom plan view of the headgear showing the anchoring junction, and the branches of the connection cord passing through the headband, FIGS. 3 and 4 are plan views of a prior art ear bud set with double-ended spring-loaded retractor in retracted and extended positions, respectively, FIGS. 5 and 6 are plan views of an ear bud set according to the present invention with an anchoring junction and showing a double-ended spring-loaded retractor in retracted and extended positions, respectively, FIG. 7 is a perspective view of a user wearing the improved headgear with electrical connecting cord extended but disconnected from an audio device, FIG. 8 is the same perspective view with the audio device connected and being stowed in a pocket on the headgear with the cover of the pocket stretched open, FIG. 9 is a modified form of the invention showing a paneled headgear with stretchable fabric pocket and ear buds stowed, FIG. 10 is the headgear of FIG. 9 with audio device in the stretchable pocket and depending ear buds for listening, FIG. 11 is another modified form of the invention showing a cold weather headgear with back pocket, earflaps and ear buds stowed, and FIG. 12 is the headgear of FIG. 11 with ear flaps down and audio device in the back pocket.

DESCRIPTION OF THE PREFERRED EMBODIMENT

Referring now to FIG. 1 of the drawing, the perspective view of FIG. 1 shows a headgear constructed in accordance with the invention in the form of a cap 10 constructed in conventional fashion with a headband 12, an adjustable connector 14, a cap cover 16 and a sun visor 18.

The construction of the above main elements of cap 10 will vary greatly with the quality and function of the cap. Usually, the cap cover is made up of triangular fabric panels such as a panel 20, usually six in number, sewn at the edges and intersecting at a common apex covered by a button. The two rear panels 22, 24 are cut out and join to make a cutout space 26 to allow for adjustment.

The adjustable connector 14 conventionally takes several forms, shown here as two nylon straps 14*a*, 14*b* connected by a buckle to adjust the headband circumference. The opposite ends of straps 14*a*, 14*b* are sewn to the respective opposite ends of a fabric headband piece 30 (see FIG. 2) to complete the headband 12 encircling the head of the user. Other types of conventional adjustment members include nylon or cloth straps with snap-in buttons or straps with Velcro® hook and loop fasteners.

The bottom edges of the six panels are sewn to the headband piece 30 so as to make two layers extending around the cap with the exception of the cutout space 26. The sun visor 18 may be fabric sewn over a pre-formed plastic insert. The foregoing constitutes conventional cap construction and there are many variations that are applicable to the present invention.

A fabric pocket 32 adapted to hold an audio device and connecting cord is provided, which has an opening 34 at the top. This is constructed simply as a fabric piece 36 folded and sewn to the bottom of the two rear panels 22, 24 as shown at an edge 36*a*. In this way the two panels 22, 24 of the cap cover serve as the back wall of pocket 32. In order that the opening 34 be stretchable or expandable, an elastic cord 38 passes through a top hem 40 and through two openings 42, 44 in the cap cover panels.

Referring to FIG. 2 of the drawing showing the underside of the cap in plan view, the ends of the elastic cord 38 are secured by metal terminating pieces 46, 48. These are pushed through the holes and turned at right angles. Other constructions of a stretchable top opening are possible, such as stitching an elastic band to the top of fabric member 36 and stitching the ends of the elastic member to the cap panels.

Pocket 32 is completed by stitching a pair of triangular fabric pieces on either side, one of which is seen at 50, to provide for expansion of the pocket 32. In order to stow the ear buds when they are not in use, the fabric member 36 is stitched to the cover, as shown at 52, leaving an opening 54. This provides a pair of bud pockets 56, 58.

In accordance with the present invention, the cap 10 is provided with a built-in set of ear buds connected to a stereo jack for listening to an audio device that is carried in pocket 32 when the cap is in place. In a preferred form of the invention, the stereo cord is collected in a double-ended spring-loaded retractor 60. The retractor 60 is seen in the pocket 32 by cutting away a portion of fabric member 36 in FIG. 1. Retractor 60 is secured with an anchoring junction 62 in an aperture 64 in the bottom of pocket 32. Ear buds 66, 68 extend from anchoring junction 62 with their cords passing through headband 12 to exit through a pair of apertures 70, 72 in the headband.

Referring now to FIGS. 3 and 4, a prior art, commercially available, set of ear buds with double-ended spring-loaded retractor is shown generally at 74 to comprise a pair of ear buds 75, 76, a stereo jack 77 and a retractor 78 interposed therebetween. FIG. 3 shows the assembly in a retracted position with cord coiled internally within the retractor. FIG. 4 shows the assembly in a fully extended position. A connecting cord comprises a common segment 79 consisting of joined cords extending to a junction 80, where the cord separates into two branch segments 81, 82. Retractor 78 is constructed to either hold the cords in an extended position (or somewhere in between) and to retract when manually actuated, either by pressing a button on the retractor body or by a slight tug on the jack and ear buds attempting to pull them apart The latter type of retracting action is preferred for the present invention for reasons to be explained.

Referring to FIGS. 5 and 6 a set of ear buds with retractor, modified according to the present invention is shown generally at 84. A stereo jack 85 is shown connected to ear buds 66, 68 by cords passing through a retractor 60. The set has been modified according to the present invention to include an anchoring junction 62 comprising a T-shaped molded body encasing the cords at the anchoring junction where they separate. See FIG. 1 for the location of these elements that carry the same reference numbers as before. The T-shaped molding at the anchoring junction is made sufficiently rugged to withstand pulling without damaging the electrical cords.

FIG. 5 illustrates the modified assembly in the retracted position where the stereo jack and the anchoring junction are drawn together. FIG. 6 shows the assembly in the extended position, with the retractor positioned midway between the stereo jack and anchoring junction along a common segment 86. Branch segments 87, 88 lead from the anchoring junction to the stereo jack 85 without being retracted.

OPERATION OF THE PREFERRED EMBODIMENT

FIGS. 7-9 illustrate the operation of the preferred embodiment. FIG. 7 shows the cap of FIGS. 1 and 2 placed on the head of a user 90 preparatory to listening to an audio device 92. The ear buds, one of which is seen at 66, have been removed from bud pockets 56 and placed in the ears of user 90.

Jack 85 is of a standard size designed to fit into the audio output port of the audio device 92. Device 92, which is not a part of the present invention, may be an FM radio, a miniature tape recorder, or preferably a digital audio player such as an MP3 player or an iPod Shuffle music player. Digital audio players typically include a display 93, an audio output port 94 and suitable control buttons and switches 95 to select and control volume of music or recorded books downloaded to the device.

The retractor 60 is drawn to its fully extended position with the anchoring junction (not shown) firmly secured in the bottom of pocket 32 on the cap 10. The common segment 86 between stereo jack and anchoring junction is of sufficient length for the jack with the attached audio device 92 to be held in the field of vision of the user 90 when the cap is in place and when ear buds are in the ears of the user. In this way the display 93 of the audio device can be seen and the control buttons and switches 95 manipulated for the desired audio content to be selected and heard at the desired volume.

FIG. 8 shows the audio device 92 being stowed in pocket 32 along with retractor 60 (not shown). By means of the elastic cord 38, the open top 34 of the pocket is expanded with one hand. The audio device, with attached stereo jack, is tugged to cause the retractor to pull itself and audio device into the pocket 32 as it is guided by the user. Once the audio device 92 is stowed in pocket 32 along with retractor 60 the user may listen to the audio content while walking, jogging or engaged in other activity without the annoying presence of cords against the face or neck and without static or interference due to cords rubbing against clothing.

Modification

FIGS. 9 and 10 show a modification of the invention. A cap 170 with at least one rear panel 172 has an elastic headband (not shown) which omits the need for the opening 26 and adjustment strap 14 seen in FIG. 1, since the headband will stretch to fit most size heads. In accordance with the present invention, a pocket 174 is provided by stitching the side and bottom hems of a laterally stretchable fabric piece 176 to the rear panel 172. A top hem 178 is left unstitched so as to leave a stretchable top opening 180.

Apertures are provided as before in the bottom of the back panel inside pocket 176 and a pair of apertures on the sides, one of which is seen at 180. A pair of bud pockets, one of which is seen at 182 is sewn to the cap 170 to accommodate ear buds, one of which is seen at 184.

FIG. 9 illustrates the cap without an audio device. A stereo cord with common segment and two branch segments, one of which is seen at 186, leading from an anchoring junction (not shown) is installed as before. The stereo cord incorporates a retractor (not shown) constructed as shown in FIGS. 5 and 6. The stereo jack and common segment are stowed in pocket 174 out of sight and the ear buds are stowed in the bud pockets as shown.

FIG. 10 illustrates the cap in use with an audio device attached to the stereo jack and stowed in pocket 174 as shown by the bulge 188. The ear buds are deployed having been placed in the ears of a user (not shown) before the audio device is stowed.

Second Modification

FIGS. 11 and 12 show yet another modification of the invention, illustrated as a cold weather hat 190, having a cover 192, front visor 194, rear flap 196 and ear flaps 198, 200, all of heavy insulating material suitable for providing warmth. The ear flaps are provided with a cord for tying together at the top as shown in FIG. 11 and are foldable down as shown in FIG. 12 to cover the ears, whereupon the cord 202 may be tied under the chin, as well known in the art.

According to the invention, the rear flap 196 is attached to cover 192 with elastic stretchable fabric pieces 204. This provides a stretchable top opening into a pocket 206 between the rear flap and the cover that will accommodate the audio device and stereo cord (not shown). The stereo cord includes a retractor (not shown) and is as shown in FIGS. 5 and 6. An anchoring junction (not shown) for the stereo cord is secured in the bottom of pocket 206 in the manner previously described. A pair of apertures is provided where the ear flaps join the cover, one of which is seen at 208 in FIG. 11, along with an ear bud 210. The upstanding side edges of the front visor 194 serve as ear bud pockets. In FIG. 12, showing the audio-equipped cold weather hat in use, the stereo jack and common segment are stowed in pocket 206 out of sight and the ear buds covered by the ear flaps when they are turned down.

While there is shown what is considered to be the preferred embodiment and two modifications of the invention, other modifications will become apparent to those skilled in the art. It is intended to cover in the appended claims all such modifications as fall within the true spirit and scope of the invention.

The invention claimed is:

1. Audio docking headgear adapted to carry an audio device and to enable a user to view and manipulate the controls of the audio device while wearing the headgear, comprising:

headgear having a pocket disposed on the rear thereof, said pocket having an interior and an open top;

an audio cord assembly having a plug-in jack, a pair of ear buds, and connection cords electrically connecting said jack to each ear bud of said pair of ear buds, said connection cords comprising a common segment connected at one end thereof to said jack and bifurcated at an anchoring junction into a pair of branch segments, each said branch segment connected at an end thereof to a respective ear bud, said interior of said pocket being of sufficient size to receive both said audio cord assembly and an audio device connected to said jack;

means securing said anchoring junction in the bottom of said pocket, said branch segments being of sufficient length to extend along the headgear and then to depend therefrom to the ears of a user wearing the headgear, said common segment being of sufficient length to allow said jack to extend from said anchoring junction to the field of vision of a user wearing the headgear; and a double-ended spring-loaded retractor operatively disposed on the common segment substantially midway between said jack and said anchoring junction and arranged to extend or retract said common segment.

2. Audio docking headgear according to claim 1, wherein said open top of said pocket is stretchable to receive and hold said audio cord assembly and an audio device in said interior of said pocket.

3. Audio docking headgear according to claim 1, wherein said headgear includes a pair of bud pockets disposed adjacent the ears of a user wearing the headgear, said bud pockets being adapted to receive said respective ear buds.

4. Audio docking headgear according to claim 3, wherein said headgear includes passages conducting said branch segments from said anchoring junction to locations adjacent said bud pockets.

5. Audio docking headgear according to claim 1, wherein said double ended spring-loaded retractor is arranged to temporarily retain the common segment in an extended position so that an audio device connected to the jack may be viewed and manipulated while in the field of vision of a user wearing the headgear.

6. Audio docking headgear according to claim 1, where in said anchoring junction is constructed as a T-shaped body arranged to receive and embed portions of said common segment and said branch segments.

7. Audio docking headgear according to claim 1, wherein said headgear includes a cap cover and wherein said pocket comprises a fabric member attached to said cap cover.

8. Audio docking headgear according to claim 7 and further including an elastic cord connecting said fabric member to said cap cover to provide a stretchable top opening for said pocket.

9. Audio docking headgear according to claim 7, wherein said fabric member comprises a laterally stretchable fabric piece attached to said cap cover to provide a stretchable top opening for said pocket.

10. Audio docking headgear adapted to carry an audio device and to enable a user to view and manipulate the controls of the audio device while wearing the headgear, comprising:

a cap having a headband for encircling the head of a user, a plurality of connected panels attached to the headband to form a cap cover, a fabric member attached to the cap cover to provide a pocket, the pocket having a top opening adapted to receive an audio device, an electrical cord arranged to transmit two audio signals, the electrical cord having a common segment for carrying said two audio signals and having a common terminating end, said common segment being bifurcated at an anchoring junction into first and second branch segments each arranged to transmit a respective one of said two audio signals and having respective first and second terminating ends, means securing said anchoring junction in the bottom of said pocket, said common segment being of sufficient length to enable said common terminating end to extend from the anchoring junction to the field of vision of a user wearing the headgear, said first branch segment extending from said anchoring junction along the headband to a location on the headband adjacent an ear of a user wearing the headgear, the second branch segment extending along the headband in a direction opposite that of the first branch segment to a location on the headband adjacent the other ear of a user wearing the headgear, a stereo plug-in jack electrically connected to said common terminating end and adapted to plug into an audio device; a first ear bud electrically connected to said first terminating end; and a second ear bud electrically connected to said second terminating end, a pair of bud pockets on either side of the headgear adapted to receive and hold the first and second ear buds out of the way when the audio device is not in use, and a double-ended spring-loaded cord retractor operatively disposed on the common segment substantially midway between said jack and said anchoring junction and arranged to extend or retract said common segment.

* * * * *